(12) United States Patent
Swinbanks

(10) Patent No.: US 6,462,927 B2
(45) Date of Patent: *Oct. 8, 2002

(54) APPARATUS AND METHOD FOR SPATIALLY COUPLING AN ELECTRO-MAGNET TO A SUPPORT ARMATURE

(75) Inventor: Malcolm A Swinbanks, Cambridge (GB)

(73) Assignee: Bae Systems Electronics Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,239

(22) Filed: Feb. 28, 1997

(65) Prior Publication Data

US 2002/0093777 A1 Jul. 18, 2002

(51) Int. Cl.[7] .............................................. H01H 47/00
(52) U.S. Cl. ....................... 361/146; 361/144; 248/550
(58) Field of Search ................................ 361/143, 144, 361/145, 146, 147, 159; 248/550

(56) References Cited

U.S. PATENT DOCUMENTS

| | | | | |
|---|---|---|---|---|
| 5,000,415 A | * | 3/1991 | Sandercock | 248/550 |
| 5,172,160 A | * | 12/1992 | Van Eijk et al. | 355/53 |
| 5,387,851 A | * | 2/1995 | Nuscheler et al. | 248/550 |
| 5,626,332 A | * | 5/1997 | Phillips et al. | 248/550 |

FOREIGN PATENT DOCUMENTS

| | | | |
|---|---|---|---|
| GB | 1385212 | 2/1975 | G05D/3/08 |
| GB | 1385 212 | 2/1975 | G05D/3/08 |
| GB | 2 259 158 A | 3/1993 | B60L/13/06 |

* cited by examiner

*Primary Examiner*—Ronald W. Leja
(74) *Attorney, Agent, or Firm*—Kirschstein, et al.

(57) ABSTRACT

An electro-magnet (11) is spatially coupled with respect to a support armature (15) by an operational gap (16) and their relative movement is automatically compensated by controlling a current (14) supplied to the electromagnet (11). The current (14) and hence a magnetic field (F) are controlled by a current controller (13) which incorporates a transfer function and is operated in a feedforward path (19) by a signal (18) from a sensor (17) which detects variations in the gap (16) between the electro-magnet (11) and the support armature (12). The current controller (13) is also operated in a feedback path (22) by a signal (21) from a sensor (20) which detects variations in the flux intensity of the magnetic field (F). The operation of the current controller (18) by the sensors (17 and 20) controls the force by which the support armature (15) is attracted towards the electro-magnet (11), while maintaining the gap (16) at a desired value and inhibiting the transmission of vibration between the support armature (15) and the electro-magnet (11).

6 Claims, 2 Drawing Sheets

APPARATUS AND METHOD FOR SPATIALLY COUPLING AN ELECTRO-MAGNET TO A SUPPORT ARMATURE

BACKGROUND OF THE INVENTION

This invention relates to an apparatus and method for spatially coupling an electro-magnet to a support armature such that movement of either the electro-magnetic or support armature is automatically compensated for so that such movement is not substantially transferred between the electro-magnet or the support armature. Such apparatus are often referred to as support actuators.

At present, it is possible to couple a base to a vibrating load support armature using an electro-magnet mounted to the base, the electro-magnet when energised with a suitable fixed current produces a magnetic field which exerts an attraction force on the support armature so as to attract the support armature towards the electro-magnet when the support armature is positioned within the magnetic field. It should be understood that there is a physical gap between the support armature and the electro-magnet.

An electro-magnet can be considered as a dual input, single output device. The output being the attraction force exerted by the magnetic field on the support armature. The attraction force is dependent on the inputs, the first being a current which is used to energise the electro-magnet and the second being dependent on the magnitude of the gap. For example, the attraction force exerted on the support armature increases as the support armature is positioned closer to the electro-magnet, e.g. the magnitude of the gap is reduced, and decreases as it is positioned further from the electro-magnet, e.g. the magnitude of the gap is increased. The attraction force exerted by an electro-magnet on a support armature is analogous to a strong negative spring.

It is common practice to employ high gain feedback control on the electro-magnet in an attempt to convert the strong negative spring into a weak negative spring so that more precise control of the attraction force of the electro-magnet can be applied.

However, such high gain feedback cannot be maintained over an infinite bandwidth and in practice the gain of the feedback must ultimately roll-off towards zero with increasing frequency. The result of the roll off effect causes a change in phase and the weak negative spring then tends to behave more like a negative damper. This feeds energy into variations in the gap which can readily excite any structural resonance in the roll off frequency range. This in turn generates undesirable force variations on the support armature.

BRIEF SUMMARY OF THE INVENTION

It is the object of this invention to obviate or mitigate this disadvantage.

According to a first aspect of the present invention there is provided an apparatus, comprising a current controller operable to produce a variable current, an electro-magnet connected to receive said variable current and to generate a magnetic field having a flux intensity dependant on said variable current, a support armature separated from said electro-magnet by an operational gap and supported by said magnetic field, a first control means arranged to detect variation in said operational gap and to operate said current controller dependant on variation in said operational gap, a second control means arranged to detect variation of said flux intensity and to operate said current controller dependant on variation of said flux intensity, and said first control means and said second control means being arranged to vary said current in said electro-magnet whereby the flux intensity of said magnetic field will maintain said operational gap substantially constant.

Preferably, said first control means may comprise a gap sensor arranged to detect variation in said operational gap, said first control means may also be arranged to generated a control signal dependant on variation in said operational gap, and said control signal may be arranged to operate said current controller. The said first control means may be arranged in a feedforward path from said gap sensor to said current controller.

Preferably, said second control means may comprise a flux sensor arranged to detect said variation in said flux intensity, said second control means may also be arranged to generate a control signal dependant on variation in said flux intensity, and said control signal may be arranged to operate said current controller. The said second control means may be arranged in a feedback path from said flux sensor to said current controller.

Operation of said controller may be determined by a transfer function of a relationship between said control signal generated by said first control means, said control signal generated by said second control means and said variable current applied to said electro-magnet, and said current controller may be arranged to produce said variable current dependant on said transfer function.

According to a second aspect of the present invention there is provided an apparatus for isolating vibration between a load and a support structure, comprising a current controller operable to produce a variable current, an electro-magnet connected to receive said variable current and to generate a magnetic field having a flux intensity dependent on said variable current, said load supported from said support structure by said magnetic field between said electro-magnet and said support armature, a first control means arranged to detect variations in said operational gap and to operate said current controller dependant on variations in said operation gap, a second control means arranged to detect variations of said flux intensity and to operate said current controller dependant on variations of said flux intensity, and said first control means and said second control means being arranged to vary said current in said electro-magnet whereby the flux intensity of said magnetic field will maintain said operational gap substantially constant and inhibit transmission of vibration therebetween.

According to a third aspect of the present invention there is provided a method of spatially coupling a support armature with respect to an electro-magnet, comprising applying a current to said electro-magnet to generate a magnetic field having a flux intensity dependant on said current, and controlling an operational gap between said armature and said electro-magnet by detecting variation in said operational gap and detecting variation in said flux intensity, and varying said current dependant on the variation in both said operational gap and said flux intensity.

Preferably, the method may also comprise varying said current dependant on a transfer function of a relationship between a. variations in said operational gap, b. variations in said flux intensity, and c. said current applied to said electro-magnet According to a fourth aspect of the present invention there is provided a method of isolating vibration between a load and a support structure, comprising supporting a load from said support structure by a magnetic field across an operation gap between an armature and an electro-magnet, and controlling said operational gap by detecting variation in said operational gap and detecting variations in said flux intensity, and varying flux intensity of said magnetic field dependant on the variation both in said operational gap and said flux intensity.

The positioning and protection of these electro-magnets and support armatures is taught in our co-pending British Applications GB. A [that is British Application 9604973.9] and GB A [that is British Application 9604952.3] both filed on Mar. 8, 1996, the whole contents of each Application being incorporated herein by reference.

BRIEF DESCRIPTION OF THE DRAWINGS

The invention is further described, by way of example only, with reference to the accompanying drawings, in which.

DETAILED DESCRIPTION OF THE INVENTION

Given that an electro-magnet can be operably connected to receive an input current, that the electro-magnet can generate a magnetic field using such input current and that a support armature can be separated from the electro-magnet by an operational gap, the electro-magnet can be considered a dual input, single output device. That is the electro-magnet has a single output in the form of a magnetic field having a flux intensity determined by both magnitude of the input current supplied to the electro-magnet and magnitude of the operational gap. For example, if the input current is constant, then variations in the gap will cause variations in the flux intensity of the magnetic field. This effect can be characterised mechanically as a negative spring.

Since the electro-magnet naturally has the characteristics of a negative spring, the electro-magnet is very difficult to control using high gain feedback, especially at high frequencies, due to the roll-off to unity of the gain with increasing frequency Furthermore phase shifts, associated with the roll-off of the gain with increasing frequency, cause the electro-magnet to behave more like a strong negative damper which feeds energy into variations of the gap. Such negative damping will accordingly result in the electro-magnet transferring vibrations to the support armature. Negative damping will also excite any structural resonance in the roll-off frequency range and will thereby generate force variations on the support amaure and consequent instability. The present invention avoids this problem by giving positive mechanical spring characteristics to the electro-magnet.

Figure 1:
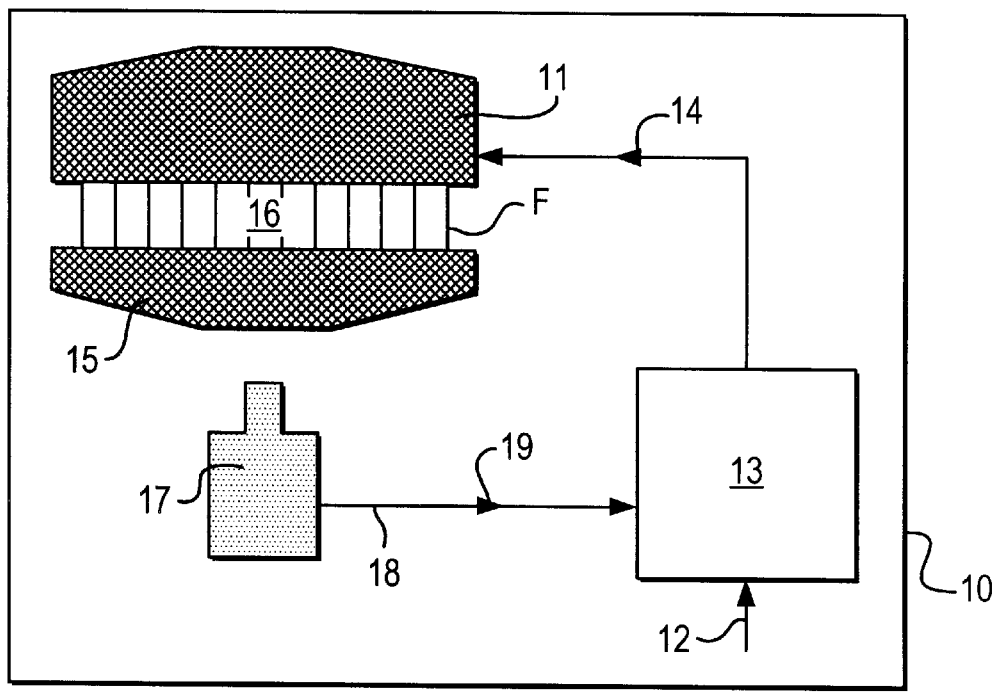
FIG. 1 illustrates a feedforward section of an apparatus according to the present invention.

Referring to FIG. 1, apparatus 10 comprises an electro-magnet 11 operably connected to an input current 12 via a current controller 13 and is arranged to generate a magnetic field F having a variable flux intensity according to a variable current 14 supplied by the current controller 13. The flux intensity is controlled to keep the electro-magnet 11separated from a support an nature 15 by an operational gap 16.

This is achieved by operably connecting a gap sensor 17 to the current controller 13, the gap sensor being arranged to produce a first control signal 18 representing variation in the gap 16, and by feeding the first control signal 18 forward along a feedforward control path 19 to the current controller 13 to control the variable current 14. A suitable gap sensor 17 can be any inductive proximity detector which is commercially available.

Figure 2:
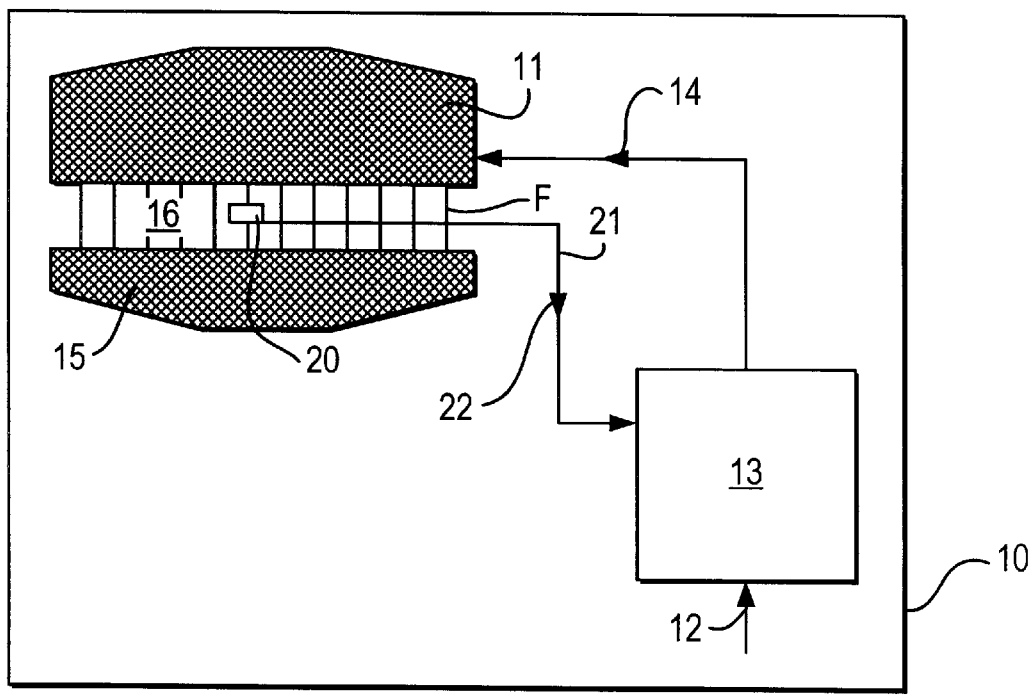
FIG. 2 illustrates a feedback section of the same apparatus.

Referring to FIG. 2, the control of the gap 16 can be improved still further by also using a flux sensor 20 to operate the current controller 13. The flux sensor 20 is arranged to detect variations in the flux intensity generated by the magnetic field F of the electro-magnet 11 and to produce a high gain second control signal 21 representing the variations. By feeding back the high gain second control signal 21 along a feedback control path 22 to the current controller 13, precision of control of the magnetic field F is made virtually independent of any variation in the gap 16. A suitable flux sensor 20 can be any Hall effect device which is commercially available.

Operation of the current controller 13 is determined by a transfer function of the observed relationship between the first control signal 18, the second control signal 21 and the variable current 14 applied to the electro-magnet 11 to generate the magnetic field F.

By determining the correct transfer function for the current controller 13, the feedforward control path 19 is biased so that the characteristics of the electro-magnet 11 are radically changed so that it behaves like a weak positive spring with phase shifts associated with increasing frequency causing the electro-magnet 11 to behave like a positive damper. The feedforward control path 19 can have a very wide bandwidth, but the precision of control is dependent on the precision of the measurements used to determine the transfer function.

The high gain second control signal 21 provided along the feedback control path 22 further modifies the characteristics of the electro-magnet 11 to make it behave like an even weaker positive spring so that, when the high gain second control signal 21 rolls off with increasing frequency, the associated phase shifts generate positive damping in the electro-magnet 11 which extracts energy from any variations in the gap 16 in the roll off frequency range. Therefore any structural resonance in this frequency range will be damped and will not generate force variations on the support armature 15.

Figure 3:
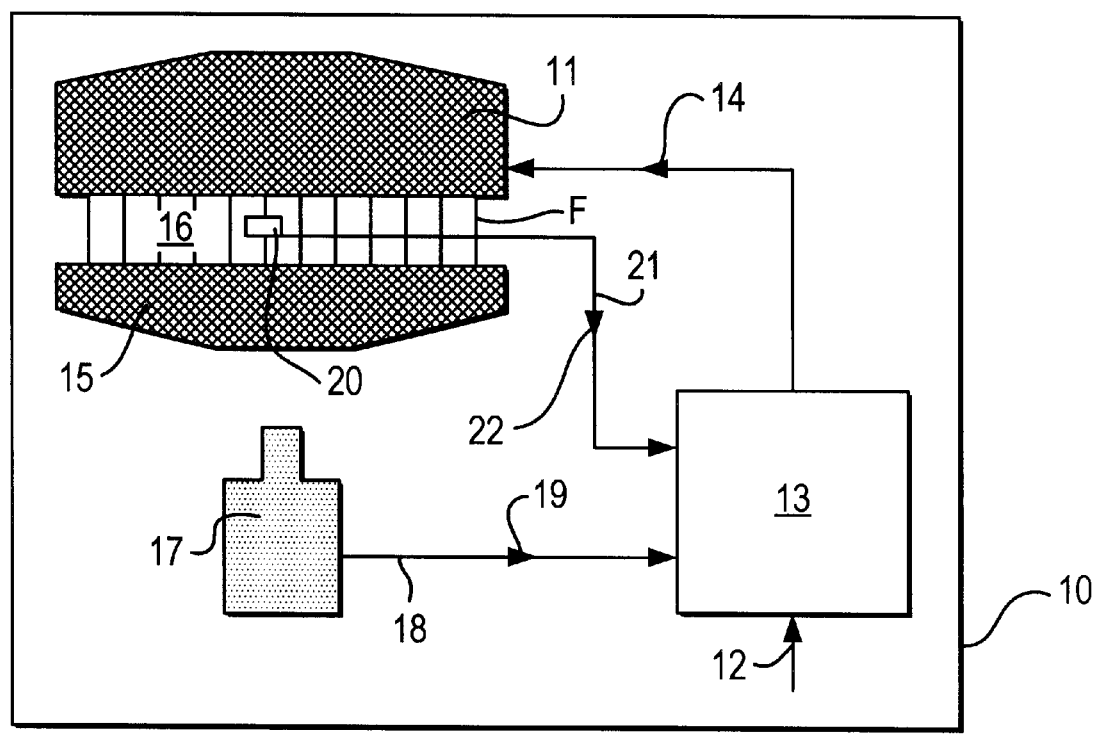
FIG. 3 illustrates a complete apparatus of the present invention comprising both feedforward and feedback sections given in FIGS. 1 and 2.

FIG. 3, illustrates both the feedforward control path 19 and the feedback control path 22 applied to the electro-magnet 11 via the current controller 13, all references are the same as those used in FIGS. 1 and 2 and the associated description.

Appropriate variation of the current 14 applied to the electro-magnet 11, by using the first control signal 18 and the second control signal 21 to operated the current controller 13, causes the support armature 15 to levitate in a controlled position in the magnetic field F created by the electro-magnet 11. Thereby the electro-magnet 11 and the support armature 12 are coupled at a selected spacing, the operational gap 16, by the attraction of the magnetic field F.

If the support armature 15 is attached to a vibrating load, it will move with respect to the electro-magnet 11 and the gap 16 will vary. Such variations in the gap 16 are detected by the gap sensor 17 and the first control signal 18 is generated depending on the magnitude of variation of the gap 16. The first control signal 18 controls the input current 12 to generate the variable current 14 that in turn varies the strength of the magnet field F generated by the electro-magnet 11 thereby compensating for variations in the gap 16. In this manner the support armature 15 will be returned to its original position relative to the electro-magnet 11 by appropriate variation of the variable current 14.

Greater precision for maintaining the gap 16 can be achieved by providing the high gain second control signal 21 in feedback from the flux sensor 20 in the magnetic field F of the electro-magnet 11 to the current controller 13. Variations in the flux are measured a second control signal 21 is generated according to the variations and is used to vary the current 14 proportionally to the variations in the magnitude of the flux to maintain the gap 16.

The vibrating load may alternatively be attached to the electro-magnet 11 instead of the support armature 15.

This arrangement achieves high stability and, in the frequency range in which both controls are operating, the precision achieved is much higher than could be achieved by either control operating individually.

I claim:

1. A apparatus comprising:
   a) a current controller operable to produce a variable current;
   b) an electromagnet connected to receive said variable current and to generate a magnetic field having a flux intensity dependent on said variable current;
   c) a support armature separated from said electromagnet by an operational gap and supported by said magnetic field;
   d) a gap sensor for detecting variations in said operational gap and for providing signals indicative thereof;
   e) a first control means connected to said gap sensor for receiving said signals therefrom and for providing a first control signal to said current controller in accordance with said variations in said operational gap, said first control means being arranged in a feedforward path between said gap sensor and said current controller;
   f) a flux sensor for detecting variations in said flux intensity and for providing signals indicative thereof;
   g) a second control means connected to said flux sensor for receiving signals therefrom and for providing a second control signal to said current controller in accordance with said variations in said flux intensity, said second control means being arranged in a feedback path between said flux sensor and said current controller; and
   h) said first and second control means being arranged to vary said variable current in said electromagnet in order that said flux intensity of said magnetic field maintains the mean value of the operational gap substantially constant while permitting said support armature to vibrate freely.

2. The apparatus of claim 1, wherein operation of said current controller is determined in accordance with a transfer function determined by a relationship between said first control signal, said second control signal and said variable current applied to said electromagnet, said current controller producing a variable current which is dependent on said transfer function.

3. An apparatus for isolating vibration between a load and a support structure, the apparatus comprising:
   a) a current controller operable to produce a variable current;
   b) an electromagnet connected to receive said variable current and to generate a magnetic field having a flux intensity dependent on said variable current;
   c) a support structure separated from said electromagnet by an operational gap and supported by said magnetic field;
   d) said load being supported from said support structure by said magnetic field between said electromagnet and said support structure;
   e) a gap sensor for detecting variations in said operational gap and for providing signals indicative thereof;
   f) a first control means connected to said gap sensor for receiving said signals therefrom and for providing a first control signal to said current controller in accordance with said variations in said operational gap, said first control means being arranged in a feedforward path between said gap sensor and said current controller;
   g) a flux sensor for detecting variations in said flux intensity and for providing signals indicative thereof;
   h) a second control means connected to said flux sensor for receiving signals therefrom and for providing a second control signal to said current controller in accordance with said variations in said flux intensity, said second control means being arranged in a feedback path between said flux sensor and said current controller; and
   i) said first and second control means being arranged to vary said variable current in said electromagnet in order that said flux intensity of said magnetic field maintains the mean value of the operational gap substantially constant and inhibit transmission of vibration between said load and said support structure while permitting said support structure to vibrate freely.

4. A method of spatially coupling a support armature with respect to an electromagnet, the method comprising the steps of:
   a) applying a variable current to said electromagnet to generate a magnetic field having a flux intensity dependent on said current;
   b) detecting variations in an operational gap between said support armature and said electromagnet;
   c) detecting variations in said flux intensity between said support armature and said electromagnet; and
   d) controlling said operational gap between said support armature and said electromagnet by varying said variable current in accordance with said detected variations in said operational gap and said flux intensity to maintain the mean value of said operational gap substantially constant and to inhibit transmission of vibration between said electromagnet and said support armature while permitting the support armature to vibrate freely, said variations in said operational gap being determined in a feedforward path and said variations in said flux intensity being determined in a feedback path.

5. The method of claim 4, further comprising the step of varying said variable current in accordance with a transfer function determined by a relationship between said variations in said operational gap, said flux intensity and said variable current applied to said electromagnet.

6. A method of isolating vibrations between a load and a support structure, the method comprising the steps of:

a) supporting said load from said support structure by a magnetic field across an operational gap between said support structure and an electromagnet;
b) detecting variations in said operational gap between said support structure and said electromagnet;
c) detecting variations in said flux intensity between said support structure and said electromagnet; and
d) controlling said operational gap between said support structure and said electromagnet in accordance with said detected variations in said operational gap and said flux intensity to maintain the mean value of said operational gap substantially constant and to inhibit transmission of vibration between said electromagnet and said support structure while permitting the support structure to vibrate freely, said variations in said operational gap being determined in a feedforward path and said variations in said flux intensity being determined in a feedback path.

* * * * *